United States Patent
Karri et al.

(10) Patent No.: US 12,223,935 B2
(45) Date of Patent: Feb. 11, 2025

(54) VOICE ASSISTANT SYSTEM WITH AUDIO EFFECTS RELATED TO VOICE COMMANDS

(71) Applicant: International Business Machines Corporation, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Neela Vauhini Komaragiri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 17/395,822

(22) Filed: Aug. 6, 2021

(65) Prior Publication Data
US 2023/0043956 A1    Feb. 9, 2023

(51) Int. Cl.
G10H 1/36 (2006.01)
G10L 15/22 (2006.01)
H04R 5/04 (2006.01)

(52) U.S. Cl.
CPC ............ *G10H 1/366* (2013.01); *G10L 15/22* (2013.01); *H04R 5/04* (2013.01); *G10L 2015/223* (2013.01); *G10L 2015/225* (2013.01)

(58) Field of Classification Search
CPC ... G10H 1/366; G10L 15/22; G10L 2015/223; G10L 2015/225; H04R 5/04
USPC .......................................................... 84/622
See application file for complete search history.

(56) References Cited

U.S. PATENT DOCUMENTS

| | | | |
|---|---|---|---|
| 5,542,000 A * | 7/1996 | Semba | G10H 1/363 84/662 |
| 5,753,845 A * | 5/1998 | Nagata | G10H 1/0091 84/630 |
| 7,754,959 B2 * | 7/2010 | Herberger | G11B 27/031 84/622 |
| 10,366,691 B2 * | 7/2019 | Rochford | G06F 3/0346 |
| 10,595,083 B2 * | 3/2020 | Milavsky | H04N 21/44222 |
| 2014/0301573 A1 * | 10/2014 | Kiely | G11B 27/031 381/119 |
| 2018/0374462 A1 * | 12/2018 | Steinwedel | G10H 1/366 |
| 2019/0066685 A1 | 2/2019 | Liddell | |
| 2019/0124390 A1 * | 4/2019 | Akselrod | H04L 65/70 |
| 2019/0205469 A1 * | 7/2019 | Cunico | G06Q 30/0271 |
| 2019/0261112 A1 | 8/2019 | Norris | |
| 2019/0392821 A1 | 12/2019 | Kline | |
| 2020/0084564 A1 | 3/2020 | Mindlin | |

(Continued)

OTHER PUBLICATIONS

"What is a Voice User Interface (VUI)?", Alan Blog, © 2021 Alan Blog, Downloaded from the Internet on Jul. 20, 2021, 13 pgs., <https://alan.app/blog/voiceuserinterface/>.

(Continued)

*Primary Examiner* — Christina M Schreiber
(74) *Attorney, Agent, or Firm* — Caleb D. Wilkes

(57) ABSTRACT

Voice command type entry used as a basis for applying "audio effects" (see definition herein), "sound effects" (see definition herein) and/or audio edits (see definition herein) to a sound signal. This may be done so that the various types of instructed audio processing evoke, in typical listeners, a desired sentiment or mood. Artificial intelligence may be used to accomplish this objective.

20 Claims, 5 Drawing Sheets

(56) References Cited

U.S. PATENT DOCUMENTS

| | | | | |
|---|---|---|---|---|
| 2020/0126584 A1* | 4/2020 | Huang | ................... | G10L 21/10 |
| 2021/0020149 A1* | 1/2021 | Li | ....................... | G10H 1/0008 |
| 2021/0350830 A1* | 11/2021 | Smith | ................ | H04N 21/8113 |
| 2022/0122573 A1* | 4/2022 | Steinwedel | ............ | G10H 1/368 |
| 2022/0286781 A1* | 9/2022 | Yan | ......................... | H04R 5/04 |
| 2022/0301251 A1* | 9/2022 | Ko | ........................ | G10L 17/22 |
| 2022/0415339 A1* | 12/2022 | Younessian | ............ | H04N 21/84 |
| 2023/0043956 A1* | 2/2023 | Karri | .................... | G10H 1/0091 |
| 2023/0377543 A1* | 11/2023 | Flood | .................. | G10H 1/0025 |

OTHER PUBLICATIONS

Aleksic, et al., "Bringing Contextual Information to Google Speech Recognition", Interspeech 2015, Sep. 6-10, 2015, 5 pgs., Dresden, Germany, Copyright © 2015 ISCA, https://static.googleusercontent.com/media/research.google.com/en//pubs/archive/43819.pdf.

Vitali, et al., Voice Interaction Gets Contextual, Reply Connect, Downloaded from the Internet on Jul. 20, 2021, 21 pgs., <https://www.reply.com/en/Shared%20Documents/Voice-Interaction-Gets-Contextual.pdf>.

* cited by examiner

VOICE ASSISTANT SYSTEM WITH AUDIO EFFECTS RELATED TO VOICE COMMANDS

BACKGROUND

The present invention relates generally to the field of voice command interfaces for computers (for example, voice assistant systems) and also to the presentation of audio data (for example, music, conversation, speeches, movie audio) by computers to (typically) human users.

To best understand the Background, consider the following familiar situation: a user is playing streaming music through her smartphone and then through a speaker that is sitting upon her shelf. It is time for a business call to be taken through her laptop, so, to prepare for this remote conference call, the user makes a series of voice commands to her smartphone. More particularly, these voice commands would typically be directed to the operating system of the smartphone and/or app that is causing audio (in this example, streaming music) to be played. In this example, the voice commands instruct the smartphone to reduce the volume of the audio to 2% (a barely audible level) so that her streaming music will not interfere with her participation in the call.

Another Background scenario will now be given, which reflects things happening under currently conventional technology. In this scenario, a user is watching a movie, playing from a stored video file, on his desktop computer (with peripheral mic and integral display). He gives a voice command to skip to the one hour point in the movie because he has already seen the first hour of the movie. When he does this the audio track skips ahead from the one minute point in the movie to the one hour point in the movie, thereby helpfully editing out 59 minutes from the audio and video presentation currently being made to the user.

From these examples, it can be seen that, under currently conventional technology, voice commands can control certain experiential aspects of an audio presentation that is being generated by a computer.

SUMMARY

According to an aspect of the present invention, there is a method, computer program product and/or system that performs the following operations (not necessarily in the following order): (i) receiving an input data set that includes audio data for an untreated audio track and an identification of a sentiment that is to be evoked when a user listens to the audio track; (ii) applying an artificial intelligence algorithm to the input data set to determine a set of audio effect(s) to be applied to the untreated audio track to obtain audio data corresponding to a treated audio track that tends to evoke the sentiment; (iii) applying the set of audio effect(s) to the untreated audio track to obtain audio data corresponding to the treated audio track that tends to evoke the sentiment; and (iv) presenting the treated audio track as sound to at least a first user.

According to an aspect of the present invention, there is a method, computer program product and/or system that performs the following operations (not necessarily in the following order): (i) receiving an input data set that includes audio data for an untreated audio track and an identification of a sentiment that is to be evoked when a user listens to the audio track; (ii) applying an artificial intelligence algorithm to the input data set to determine a set of audio effect(s) to be applied to the untreated audio track to obtain audio data corresponding to a treated audio track that tends to evoke the sentiment; (iii) applying the set of audio effect(s) to the untreated audio track to obtain audio data corresponding to the treated audio track that tends to evoke the sentiment; (iv) applying an artificial intelligence algorithm to the input data set to determine a set of added sound(s) to be added to the untreated audio track to obtain audio data corresponding to a treated audio track that tends to evoke the sentiment; (v) applying the set of added sound(s) to the untreated audio track as a part of obtaining audio data corresponding to the treated audio track that tends to evoke the sentiment; and (vi) presenting the treated audio track as sound to at least a first user.

According to an aspect of the present invention, there is a method, computer program product and/or system that performs the following operations (not necessarily in the following order): (i) receiving an audio data set that includes an untreated version of audio content; (ii) receiving a first voice command to play the audio content of the audio data set; (iii) receiving a second voice command including information indicative of an audio effect treatment; (iv) determining a set of selected audio effect(s) from a plurality of available audio effects based on the second voice command; (v) applying the audio effect(s) of the set of selected audio effects to the audio content to obtain a treated version of the audio content; and (vi) playing the treated version of the audio content to obtain the audio effect treatment indicated by the second voice command.

DETAILED DESCRIPTION

Figure 1:
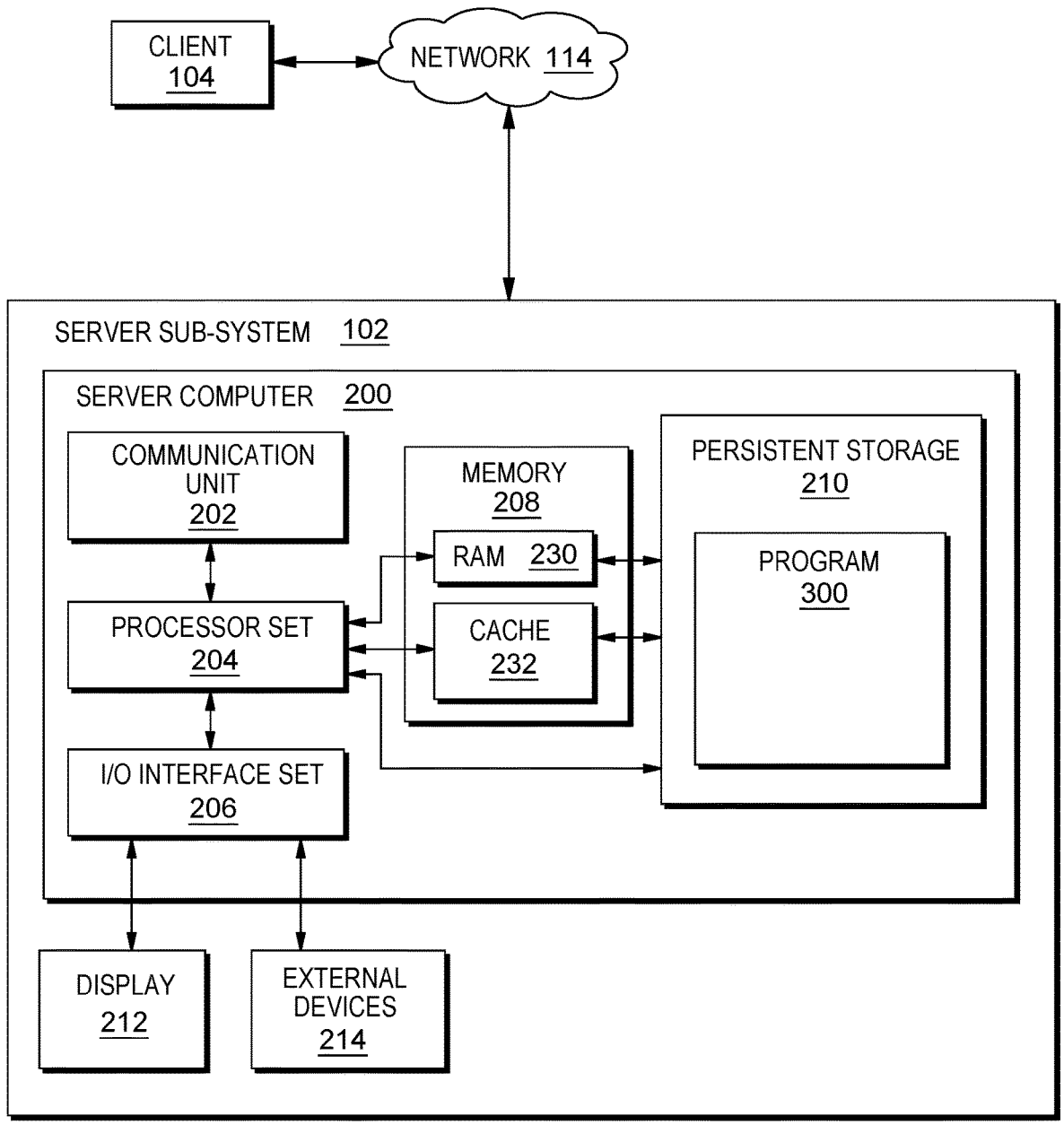
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystem 104; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210. As shown in screenshot 400 of FIG. 4, client subsystem 104 includes: user 402; peripheral desktop speakers 404; and desktop computer with integral display 406 (sometimes more simply referred to as computer 406).

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
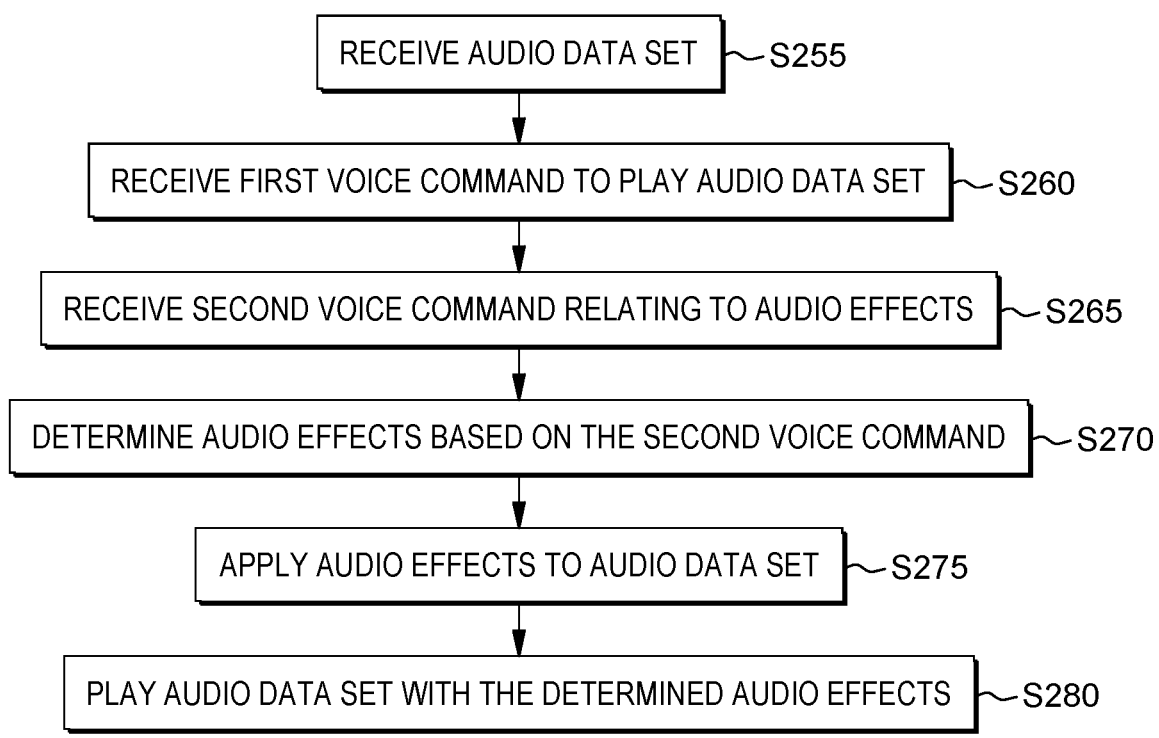
FIG. 2 is a flowchart showing a first embodiment method performed, at least in part, by the first embodiment system.
Figure 3:
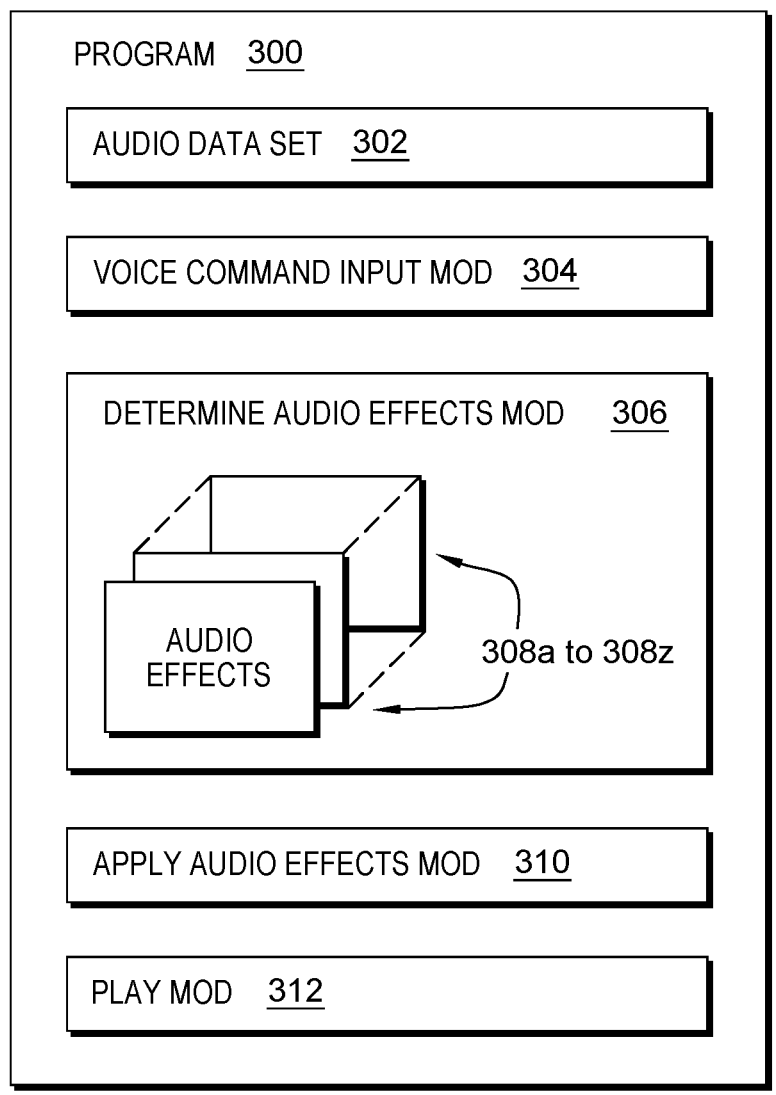
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where audio data set 302 is received. In this example, the audio data set is in the form of an audio file corresponding to an upbeat speech that the Prime Minister gave on August 27. The speech also includes a bit of music played before the Prime Minister is introduced at the start of the speech. There is also an interruption in the speech where a young girl is given the podium to sing a patriotic song. The speech is received from computer 406 of client sub-system 104 (see FIG. 4), where it was stored by user 402. User 402 is working on a class assignment and wants to see if adding "autotune" to a certain line in the speech would make it suitable for inclusion in the presentation that the student (that is, user 402) is working on. While the technical details of "autotune" are not critical to understanding the present document, it should be understood that autotune is a known audio effect that makes voices sound, roughly speaking, more musical.

Figure 4:
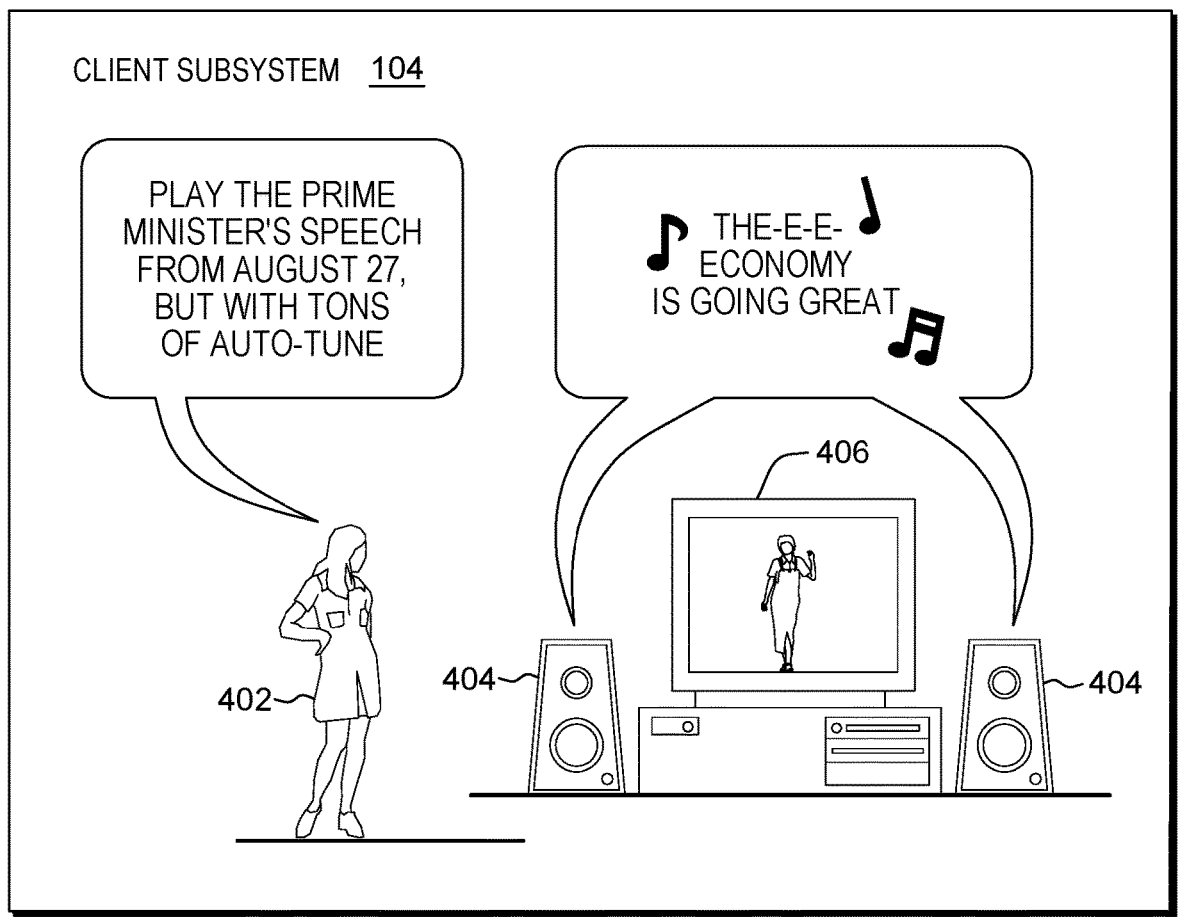
FIG. 4 is a screenshot view generated by the first embodiment system.

Processing proceeds to operation S260, where voice command input module ("mod") 304 receives a first voice command to play the audio corresponding to audio data set 302. In this example, this command is received from user 402 and through computer 406 and network 114. This voice command is shown by the first eight (8) words in the speech bubble of user 402 as shown in FIG. 4.

In this example, the request for a given basic untreated audio content made a fairly direct indication of the desired audio content. Other times the request may identify the basic untreated audio content less directly and more implicitly. For example, a user may issue a voice command as follows: "Hello voice assistant I now command you to play a feel good song that mentions turtles." There are, of course, many such songs that the voice assistant could plausibly choose here, but this type of a voice command would still be considered as a voice command to play the audio of an audio data set despite the lack of directness and/or specificity.

Processing proceeds to operation S265, where mod 304 receives a second voice command relating to audio effects. In this example, this command is received from user 402 and through computer 406 and network 114. This voice command is shown by the last five (5) words in the speech bubble of user 402 as shown in FIG. 4. In this example, the request for audio effects makes a fairly direct indication of what audio effects are to be applied. The request for audio effects to be applied, in some instances, is understood as a request to produce, from an untreated audio track, treated audio data that tends to evoke a sentiment. In some instances, the identification of the sentiment is derived directly from natural language that is part of the command. Other times the request may identify the basic untreated audio content less directly and more implicitly. For example, a user may issue a second voice command as follows: "Make it sound the way a loud rock back playing at a huge stadium as heard from a distance." Presumably this would imply some reverb and/or echo, perhaps some distortion and perhaps other audio effects. This would suffice as a voice command related to audio effects even though it does not specifically mention any audio effects.

An important point on terminology will now be made in this paragraph, relating to the terms "audio editing," "sound effects," and "audio effects." Changes to audio content like jumping forward or looping back or making volume adjustments will herein be referred to as "audio editing" and not as an "audio effect." Changes to audio content, like adding a laugh track or canned applause or words will herein be referred to as "sound effects" and not as "audio effects." As the term is defined herein, audio effects only means changes to the waveforms of the sound and would include forms of sound processing including, but not limited to: reverb, echo, phaser, distortion, autotune, vocoder, voicebox, reverse, frequency filters, audio compression, a change in speed, changes in tempo, a change in key, a change in pitch, flanger and/or pitch shifts.

Processing proceeds to operation S270, where determine audio effects mod 306 (has access to audio effects 308a to 308z in this example) determines a set of audio effect(s) to apply based on the second voice command. In this example, the determination of which effect to use (that is, autotune, also known as audio effect 308j) occurs because the user mentions the effect by name when issuing the second voice command. Under less direct or specific voice command specifications, identification of the audio effect(s) may be more computationally intensive and may involve advanced types of software such as analytics software and/or artificial intelligence software.

Processing proceeds to operation S275, where apply audio effects mod 310 applies the set of audio effect(s), previously determined at S270, to the audio content of the audio data set requested by the user's first voice command.

Processing proceeds to operation S280, where play mod 312 plays the audio data set with the determined set of audio effect(s). In some embodiments, the audio effects, and/or any added sound effects, are selected so that they evoke, in typical users, some predetermine sentiment. This potential aspect of the technology is further discussed in the next subsection of this Detailed Description section.

III. Further Comments and/or Embodiments

Some embodiments of the present invention recognize the following facts, potential problems and/or potential areas for improvement with respect to the current state of the art: (i) an AI (artificial intelligence) voice assistance system, like Amazon Alexa, and Google Home receives a voice command and accordingly the AI voice assistance system replies; (ii) the AI voice assistance system can execute one or more machine commands, search the results, and can also deliver a voice reply, such as playing a song, telling a story, etc.; and/or (iii) using AR (augmented reality)/VR (virtual reality), the system user can navigate in the VR world and the same can be different from the physical surroundings.

Some embodiments of the present invention recognize the following facts, potential problems and/or potential areas for improvement with respect to the current state of the art: (i) while interacting with the AI voice assistance system, the user might add context so that the AI voice assistance system can provide a voice reply with specific context; (ii) the context can be provided by the user in the voice command or can be identified with the VR interaction; and/or (iii) the user context is not available with the AI voice assistance system (for example, the user asks the AI voice assistance system as follows: "Alexa, Play a romantic song, and consider I'm in a hilly section and the song is coming from a long distance").

Some embodiments of the present invention may include one, or more, of the following operations, features, characteristics and/or advantages: (i) includes an AI (artificial intelligence) voice assistance system that can understand user specific context; (ii) can accommodate the same with a voice reply; and/or (iii) is based on the context of the voice command where the AI voice assistance system will dynamically be altering the sound.

Some embodiments of the present invention may include one, or more, of the following operations, features, characteristics and/or advantages: (i) includes an AI voice assistance system that can understand the user specific context: (ii) can accommodate the same with the voice reply; and/or (iii) based on the context of the voice command, the AI voice assistance system will dynamically be altering the sound.

Some embodiments of the present invention may include one, or more, of the following operations, features, characteristics and/or advantages: (i) while receiving any voice command, the AI voice assistance system will analyze the context associated to the voice command; (ii) the system will create imaginary 3D (three dimensional) surroundings where the users relative position in the imagery 3D surroundings is based on the context of the voice command; (iii) the AI voice assistance system can properly alter the sound property of the generated sound aligned with the specified context; (iv) while specifying any context, the user can also provide additional detail about the context, including: (a) weather parameters, (b) relative movement of the user, (c) presence of one or more parameters, and/or (d) removing one or more objects, etc. in the imaginary surroundings; and/or (v) the AI voice assistance system will create virtual 3D imaginary surroundings so that the voice reply from the AI voice assistance system can be altered.

Some embodiments of the present invention may include one, or more, of the following operations, features, characteristics and/or advantages: (i) while creating contextual surroundings, the user can use AR glasses to construct the imaginary surroundings; (ii) the AI voice assistance system will receive the imaginary surroundings from the AR glasses and will be accommodating the same with the sound alteration from the AI voice assistance system; (iii) once the AI voice assistance system creates imaginary 3D surroundings, then based on the 3D imaginary surroundings creation, the system will gather physical parameters of the surroundings which have influence on the sound property; (iv) accordingly, the sound property from the AI voice assistance system will be altered; and/or (v) the physical parameters can be: (a) wind speed, (b) distance from the user, (c) humidity in the surroundings; (d) doppler effect because of relative mobility parameters, and/or (d) sound reflection, absorption objects in the surroundings, etc.

Some embodiments of the present invention may include one, or more, of the following operations, features, characteristics and/or advantages: (i) while providing a contextual situation of the imaginary surroundings, the user can also provide additional sources of sound in the imaginary surroundings (although these would not be "audio effects" as that term has been defined herein); (ii) the AI voice assistance system will mix multiple sounds to create the required contextual surroundings with a voice reply; (iii) while submitting the voice command along with the contextual surroundings, the AI voice assistance system will also help the user by recommending one or more suggestions to create contextual situations from keywords spoken by the user; and/or (iv) the user can create complete contextual imaginary surroundings.

Figure 5:
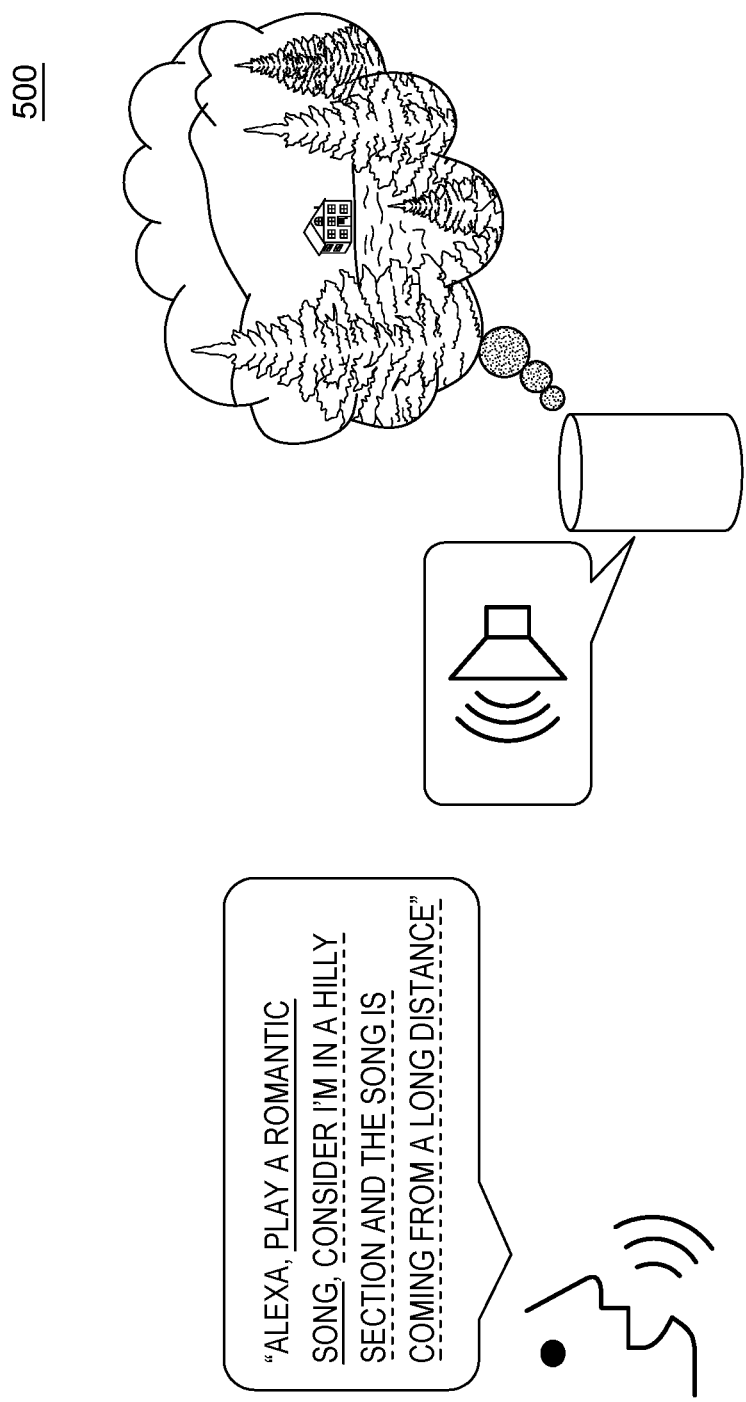
FIG. 5 is a diagram showing a second embodiment of a method according to the present invention.

As shown in FIG. 5, diagram 500 shows an example of a user submitting a voice command with imaginary contextual surroundings, and accordingly, the AI voice assistance system will alter the voice reply aligned with the contextual situation. In addition, FIG. 5, diagram 500 is helpful in understanding embodiments of the present invention. FIG. 5 shows the following features: (i) main voice command (see the speech bubble in FIG. 5); (ii) context of the surroundings (see "Hilly Section" in the speech bubble); (iii) AI voice assistance system creates imagery 3D surrounding based on the context of the voice command (see thought bubble with pine trees); and (iv) sound is altered based on the specified context.

A method according to an embodiment of the present invention includes the following operations (not necessarily in the following order): (i) the AI voice assistance system will have an imaginary 3D surroundings module; (ii) when any voice command is submitted, the AI voice assistance system will identify which part is the actual voice command and which part is the context creation of the surroundings; (iii) based on the contextual analysis of the voice command, the AI voice assistance system will identify: (a) which portion of the voice command has a search result and can be delivered, and (b) which portion describes the surroundings and can't be delivered; (iv) the AI voice assistance system will segregate the voice command and one portion will be used for executing the voice command and the another portion is used for creating a contextual situation; and (v) the AI voice assistance system will consider the context creation command and will search the public domain to identify properties of the contextual situation.

A method according to an embodiment of the present invention includes the following operations (not necessarily in the following order): (i) based on the search results from the public domain, the AI voice assistance system will identify information about the contextual surroundings; (ii) the AI voice assistance system will create an imaginary contextual surrounding where the AI voice assistance system will gather the relevant information from the public domain to create imaginary contextual surroundings; (iii) based on the created imaginary surroundings, the system will identify the relative position of different objects, (iv) based on the created imaginary surroundings, the system will identify the users relative position from the source of the sound; (v) the user can also specify the environment of the imaginary surroundings, such as wind flow, the presence of humidity, temperature, etc.; and (vi) the user can also provide mobility parameters of the user so that movement can also be considered in the imaginary surroundings.

A method according to an embodiment of the present invention includes the following operations (not necessarily in the following order): (i) the user can also create the contextual surroundings with AR glasses; (ii) using AR glasses, the user can create the contextual surroundings from where the sound will be generated; (iii) the system will identify the context created by the AR glasses and the same will be considered by the AI voice assistance system; (iv) while the imaginary surroundings are created, the system will identify the distance of different objects; and (v) if sound can be reflected, like in a mountain area, an echo situation will be created, etc.

A method according to an embodiment of the present invention includes the following operations (not necessarily in the following order): (i) based on environmental parameters, the system will also alter the sound (like where sound speed is increased during the winter and in humid air) so the same distance can create comparative louder voices in the winter, etc.; (ii) when the sound is generated by the AI voice assistance system, then the system will alter the sound as per the contextual situation; and (iii) while the AI voice assistance system delivers the sound based on the given context, the user can also provide additional input such as moving the sound further away, make the surroundings a hilly area, etc.

A method according to an embodiment of the present invention includes the following operations (not necessarily in the following order): (i) while creating the contextual situation, the user can also add one or more sources of sound in the surroundings, and the same can be added with a voice command; (ii) while updating the contextual situation with one or more additional sounds, the system will identify one or more sources of the sound; and (iii) while the main sound is being played, the system will mix the sources of sound and will create resultant sounds aligned with the main voice request.

Some embodiments of the present invention may include one, or more, of the following operations, features, characteristics and/or advantages: (i) relies on voice commands using an AI voice assistance system to analyze the context associated with the voice command; (ii) can create an imaginary 3D surrounding for the user; (iii) can create the users relative position in the imagery 3D surrounding based on the context of the voice command; (iv) the AI voice assistance system can properly alter the sound property of the generated sound aligned with the specified context; (v) the system can imagine, when specified about any parameters, and can adjust to the movement of the user, the presence of one or more objects, etc., so that the AI voice assistant creates the virtual 3D surroundings; (vi) the system does not allow altering the sound property from the AI voice assistance system by gathering the physical parameters of the surroundings that could influence the sound property; and/or (vii) aids in providing suggestions to the user about the various contextual situations just by picking up on the key words from the users past or current commands.

Some embodiments of the present invention may include one, or more, of the following operations, features, characteristics and/or advantages: (i) includes providing contextual situations of the imaginary surroundings that would add to the provision of the users additional sources of sound in the imaginary surrounding (like rain, sounds from an insect, etc.); (ii) the AI voice assistance system will mix multiple sounds to create the required contextual surroundings through the voice response; (iii) creates imaginary 3D surrounding by gathering physical parameters of the surroundings which have influence on the sound property such as wind speed, distance from the user, or humidity in the surroundings, etc. and/or (iv) focus is on optical, touch, or proximity sensing, and a combination of voice commands, gestures, and physical manipulation of real or virtual controls that interact with the digital assistant.

Some embodiments of the present invention may include one, or more, of the following operations, features, characteristics and/or advantages: (i) helps in creating any contextual surroundings; (ii) assists the user to use AR glasses to construct the imaginary surroundings; (iii) aids the AI voice assistance system to receive the imaginary surrounding from the AR glasses; (iv) does not accommodate the same with the sound alterations from the AI voice assistance system; and/or (v) refers to the Doppler effect because of relative mobility parameters, sound reflection, and absorption objects in the surroundings.

Some embodiments of the present invention may include one, or more, of the following operations, features, characteristics and/or advantages: (i) while receiving any voice command, the AI voice assistance system will analyze the context associated with the voice command and will create an imaginary 3D surrounding and the users relative position in the imagery 3D surrounding, based on the context of the voice command; (ii) the AI voice assistance system can properly alter the sound property of the generated sound aligned with the specified context (for example, if a rainy situation context is identified, then the first AI system will identify how the traffic is to be controlled in a rainy situation); (iii) provides additional detail about the context, that includes: (a) weather parameters, (b) relative movement of the user, (c) presence of one or more parameters, and/or (d) removing one or more objects, etc. in the imaginary surroundings; and/or (iv) the AI voice assistance system will create virtual 3D imaginary surroundings so that the voice reply from the AI voice assistance system can be altered.

Some embodiments of the present invention may include one, or more, of the following operations, features, characteristics and/or advantages: (i) includes creation of imaginary 3D surrounding based on a 3D imaginary surrounding creation; (ii) gathers physical parameters of the surroundings which influence the sound property: (iii) the sound property from the AI voice assistance system will be altered, wherein the physical parameters can be wind speed, distance from the user, and humidity in the surroundings; (iv) utilizes augmented reality (AR) by the user while creating contextual surroundings to construct the imaginary surroundings; (v) the AI voice assistance receives the imaginary surroundings from the AR glasses and accommodates the same with the sound alteration from the AI voice assistance; (vi) does not require any method that provides additional detail about the context, that includes: (a) weather parameters, (b) relative movement of the user, (c) presence of one or more parameters, and/or (d) removing one or more objects, etc. in the imaginary surroundings; (vii) the AI voice assistance system will create virtual 3D imaginary surroundings so that the voice reply from the AI voice assistance system can be altered; (viii) assists the user by recommending one or more suggestions to create contextual situations from keywords spoken by user; and/or (ix) the user creates complete contextual imaginary surrounding while submitting voice commands along with the contextual surrounding.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
receiving, via a first computer, an input data set that includes audio data for an untreated audio track and an identification of a sentiment that is to be evoked when a user listens to the audio track;
applying a first artificial intelligence algorithm stored in the first computer to the identification of the sentiment of the input data set to determine a set of audio effect(s) to be applied to the untreated audio track to obtain a treated audio track that tends to evoke the sentiment;
applying, via sound processing performed by the first computer, the set of audio effect(s) to the untreated audio track to obtain the treated audio track that tends to evoke the sentiment; and
presenting, via one or more audio speakers communicatively connected to the first computer, the treated audio track as sound to at least a first user.

2. The CIM of claim 1 further comprising:
applying a second artificial intelligence algorithm stored in the first computer to the input data set to determine a set of added sound(s) to be added to the untreated audio track to obtain audio data corresponding to the treated audio track that tends to evoke the sentiment; and
applying, via processing performed by the first computer, the set of added sound(s) to the untreated audio track as a part of the obtaining of the treated audio track that tends to evoke the sentiment.

3. The CIM of claim 1 wherein the input data set further includes a voice command containing natural language and the identification of the sentiment is derived directly from the natural language.

4. The CIM of claim 1 wherein the set of audio effect(s) includes at least one of the following types of audio effects: reverb, echo and/or phaser.

5. The CIM of claim 1 wherein the set of audio effect(s) includes at least one of the following types of audio effects: autotune, vocoder and/or voicebox.

6. The CIM of claim 1 wherein the set of audio effect(s) includes at least one of the following types of audio effects: a change in speed, a change in tempo, a change in key and/or a change in pitch.

7. The CIM of claim 1 wherein:
the input data set further includes information indicative of an audio editing treatment;
the CIM further comprising:
determining a set of audio edit(s) to the untreated audio track based on the audio editing treatment; and
editing the untreated audio track to make the audio editing treatment as part of the obtaining of the treated audio track.

8. A computer program product (CPP) comprising:
one or more computer-readable storage media; and
program instructions stored on the one or more computer-readable storage media to perform operations comprising:
receiving an input data set that includes audio data for an untreated audio track and an identification of a sentiment that is to be evoked when a user listens to the audio track;
applying a first artificial intelligence algorithm to the identification of the sentiment of the input data set to determine a set of audio effect(s) to be applied to the untreated audio track to obtain a treated audio track that tends to evoke the sentiment;
applying, via sound processing, the set of audio effect(s) to the untreated audio track to obtain the treated audio track that tends to evoke the sentiment; and
presenting, via one or more audio speakers communicatively connected to a computer hosting the first artificial intelligence algorithm, the treated audio track as sound to at least a first user.

9. The CPP of claim 8, wherein the operations further comprise:
applying a second artificial intelligence algorithm stored in the computer to the input data set to determine a set of added sound(s) to be added to the untreated audio track to obtain audio data corresponding to the treated audio track that tends to evoke the sentiment; and
applying, via processing performed by the computer, the set of added sound(s) to the untreated audio track as a part of the obtaining of the treated audio track that tends to evoke the sentiment.

10. The CPP of claim 8, wherein the input data set further includes a voice command containing natural language and the identification of the sentiment is derived directly from the natural language.

11. The CPP of claim 8, wherein the set of audio effect(s) includes at least one of the following types of audio effects: reverb, echo and/or phaser.

12. The CPP of claim 8, wherein the set of audio effect(s) includes at least one of the following types of audio effects: autotune, vocoder and/or voicebox.

13. The CPP of claim 8, wherein the set of audio effect(s) includes at least one of the following types of audio effects: a change in speed, a change in tempo, a change in key and/or a change in pitch.

14. The CPP of claim 8, wherein the input data set further includes information indicative of an audio editing treatment, and the operations further comprise:
determining a set of audio edit(s) to the untreated audio track based on the audio editing treatment; and
editing the untreated audio track to make the audio editing treatment as part of the obtaining of the treated audio track.

15. A computer system (CS) comprising:
a processor set;
one or more computer-readable storage media;
one or more audio speakers communicatively connected to the processor set; and
program instructions stored on the one or more computer-readable storage media to cause the processor set to perform operations comprising:
receiving an input data set that includes audio data for an untreated audio track and an identification of a sentiment that is to be evoked when a user listens to the audio track;
applying a first artificial intelligence algorithm to the identification of the sentiment of the input data set to determine a set of audio effect(s) to be applied to the untreated audio track to obtain a treated audio track that tends to evoke the sentiment;
applying, via sound processing, the set of audio effect(s) to the untreated audio track to obtain the treated audio track that tends to evoke the sentiment; and
presenting, via the one or more audio speakers, the treated audio track as sound to at least a first user.

16. The CS of claim 15, wherein the operations further comprise:
- applying a second artificial intelligence algorithm stored in the one or more computer-readable storage media to the input data set to determine a set of added sound(s) to be added to the untreated audio track to obtain audio data corresponding to the treated audio track that tends to evoke the sentiment; and
- applying, via processing performed by the processor set, the set of added sound(s) to the untreated audio track as a part of the obtaining of the treated audio track that tends to evoke the sentiment.

17. The CS of claim 15, wherein the input data set further includes a voice command containing natural language and the identification of the sentiment is derived directly from the natural language.

18. The CS of claim 15, wherein the set of audio effect(s) includes at least one of the following types of audio effects: reverb, echo and/or phaser.

19. The CS of claim 15, wherein the set of audio effect(s) includes at least one of the following types of audio effects: autotune, vocoder and/or voicebox.

20. The CS of claim 15, wherein the set of audio effect(s) includes at least one of the following types of audio effects: a change in speed, a change in tempo, a change in key and/or a change in pitch.

* * * * *